Dec. 17, 1968     O. WOSERAU ET AL     3,416,434
CHRISTMAS TREE LOADER APPARATUS
Filed May 8, 1967     6 Sheets-Sheet 2
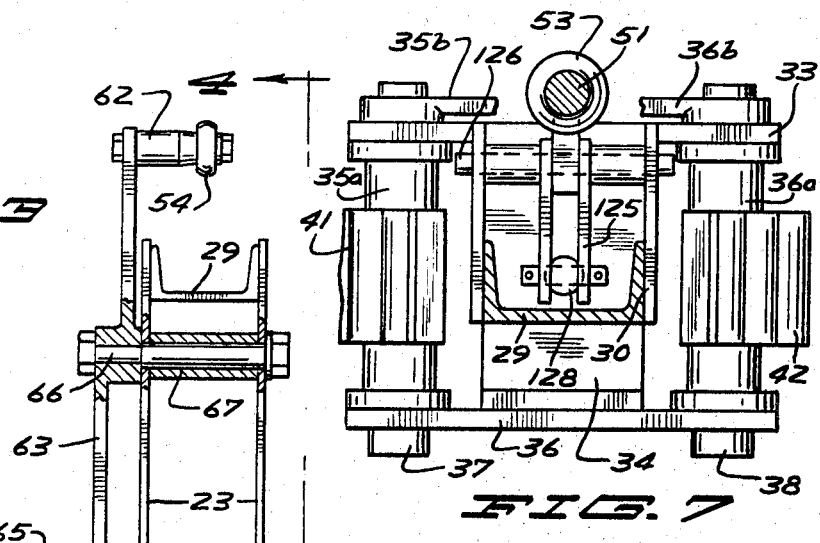
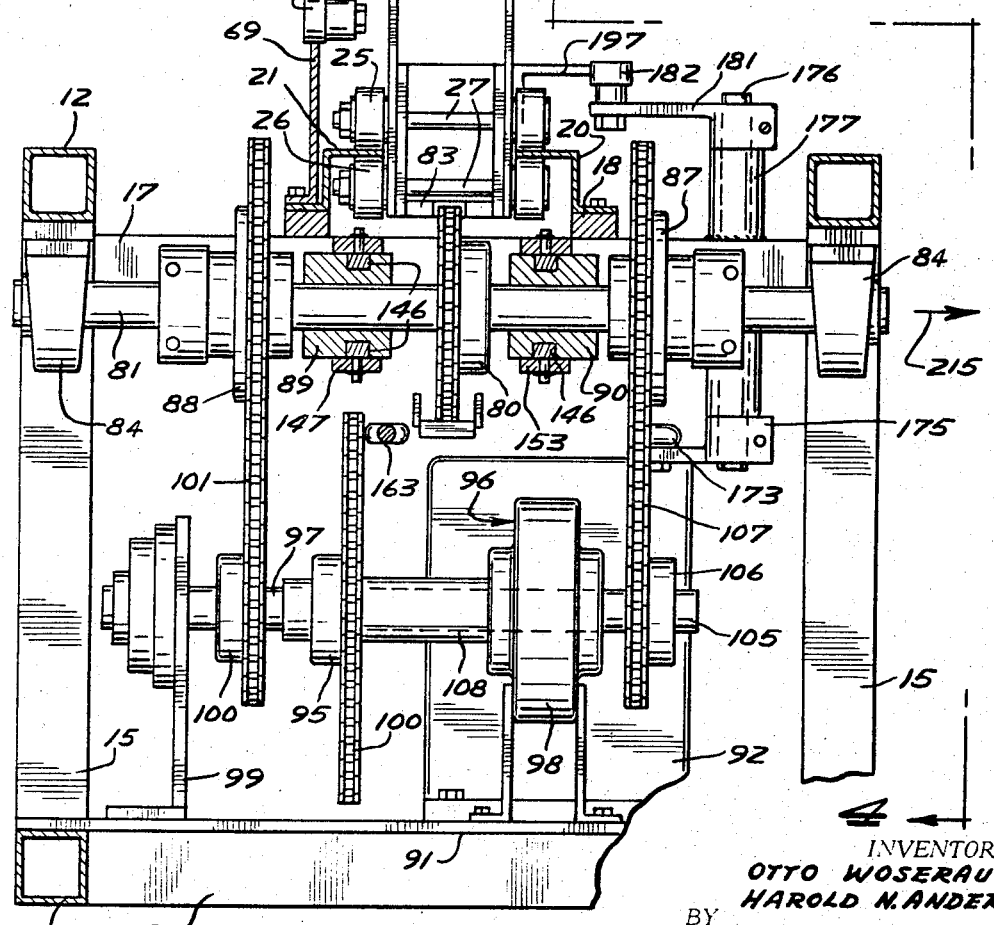
INVENTORS
OTTO WOSERAU
HAROLD N. ANDERSON
BY
*Dugger Peterson Johnson & Westman*
ATTORNEYS

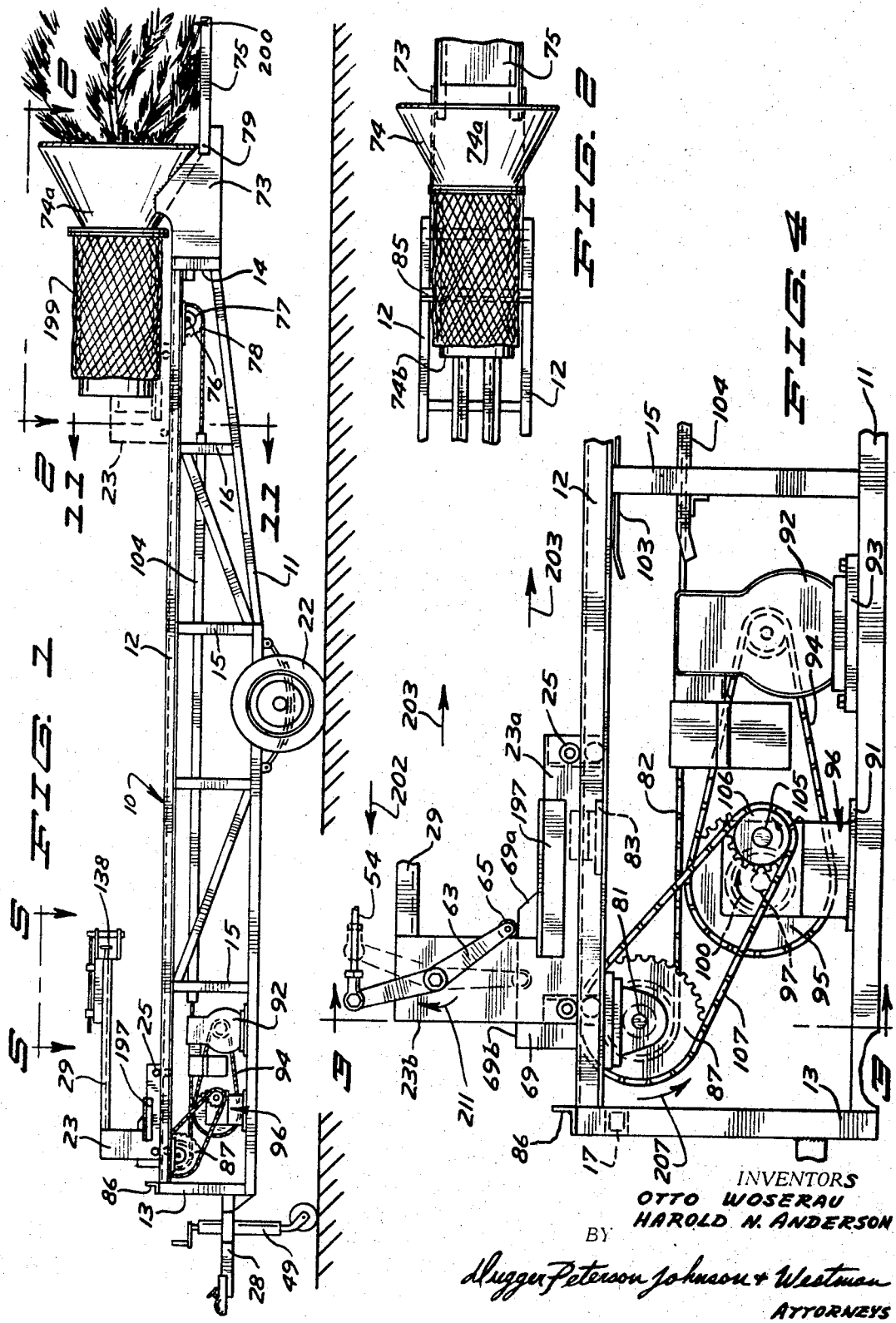

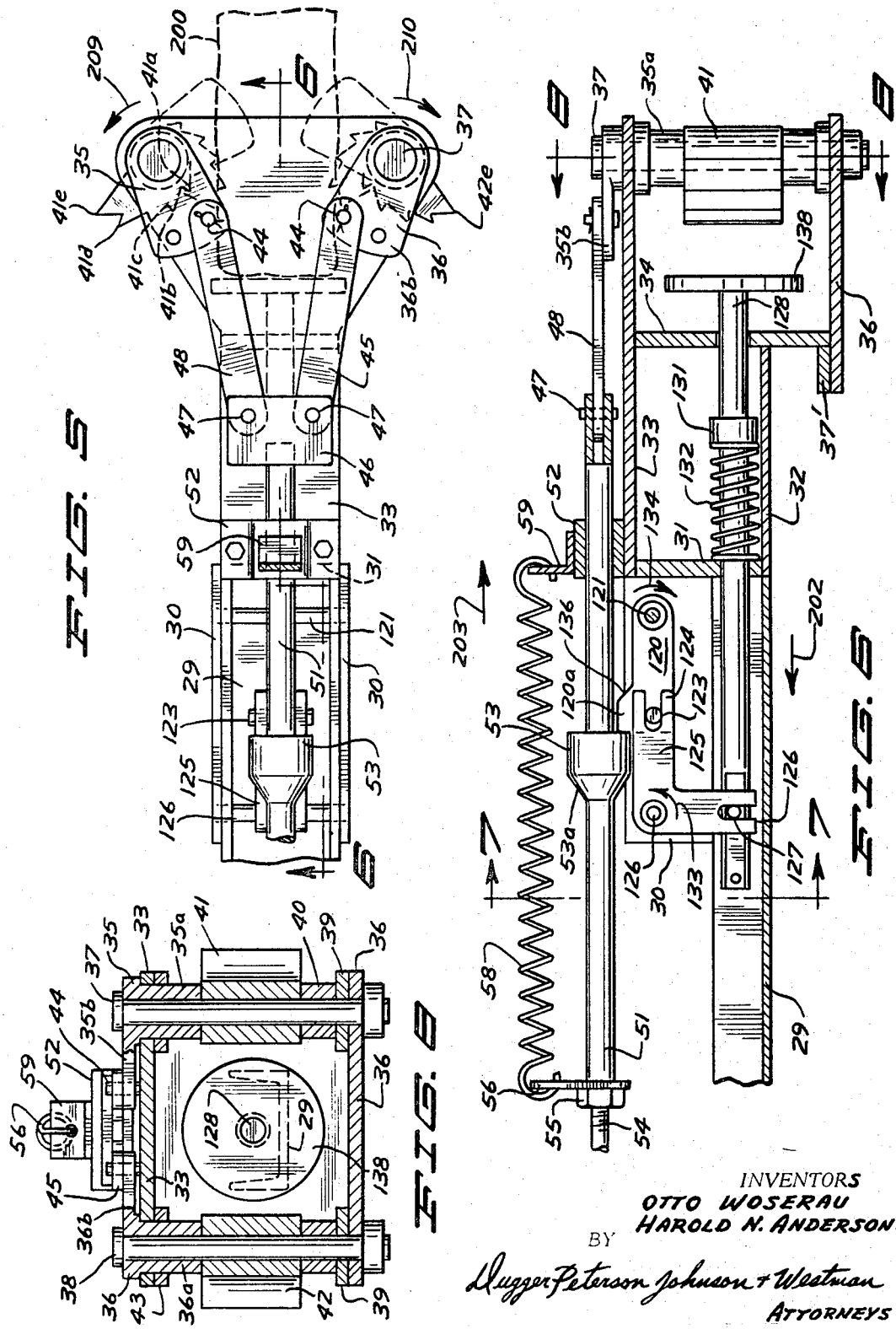

Dec. 17, 1968    O. WOSERAU ET AL    3,416,434
CHRISTMAS TREE LOADER APPARATUS
Filed May 8, 1967    6 Sheets-Sheet 4
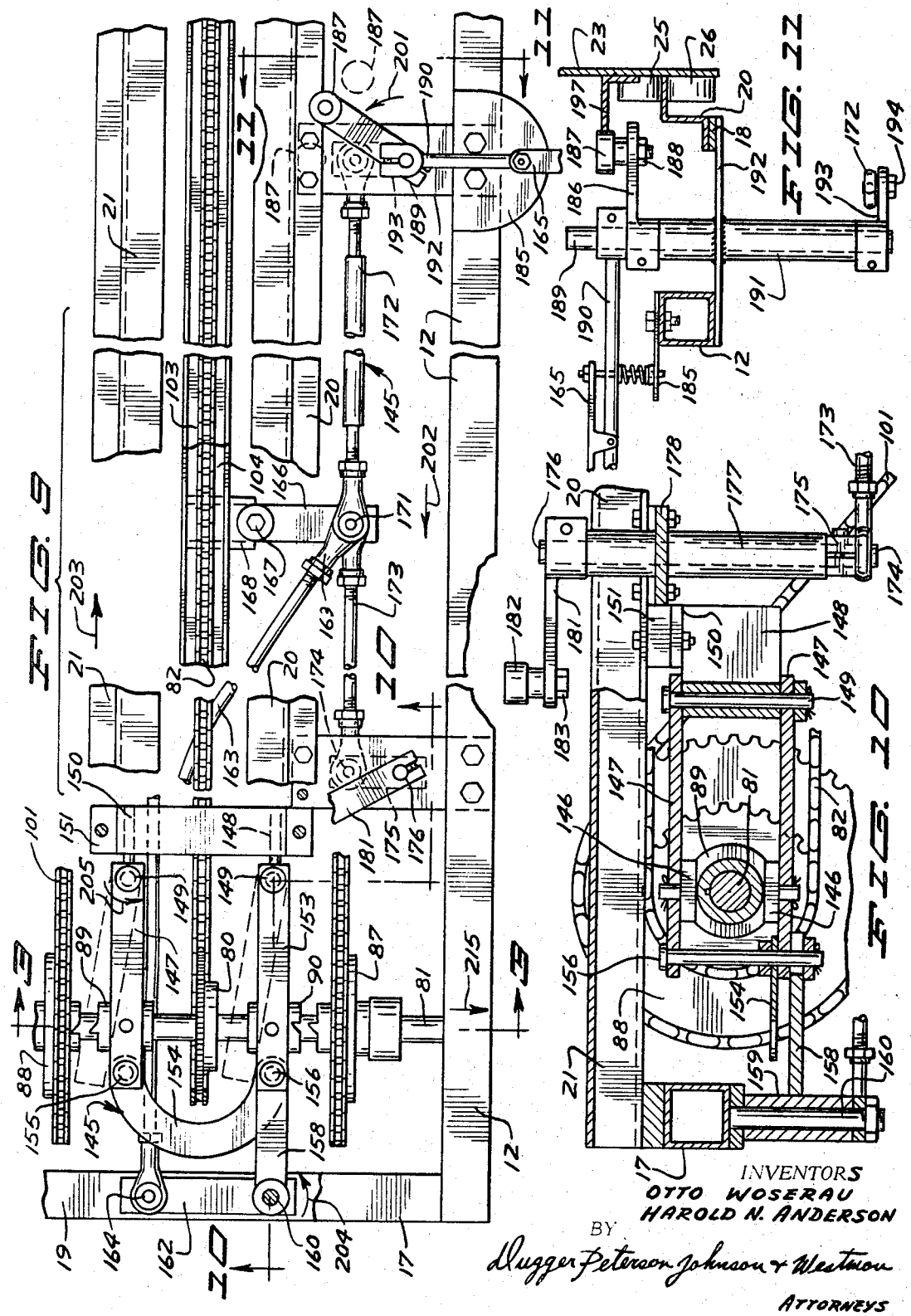
INVENTORS
OTTO WOSERAU
HAROLD N. ANDERSON
BY
Dugger Peterson Johnson & Westman
ATTORNEYS

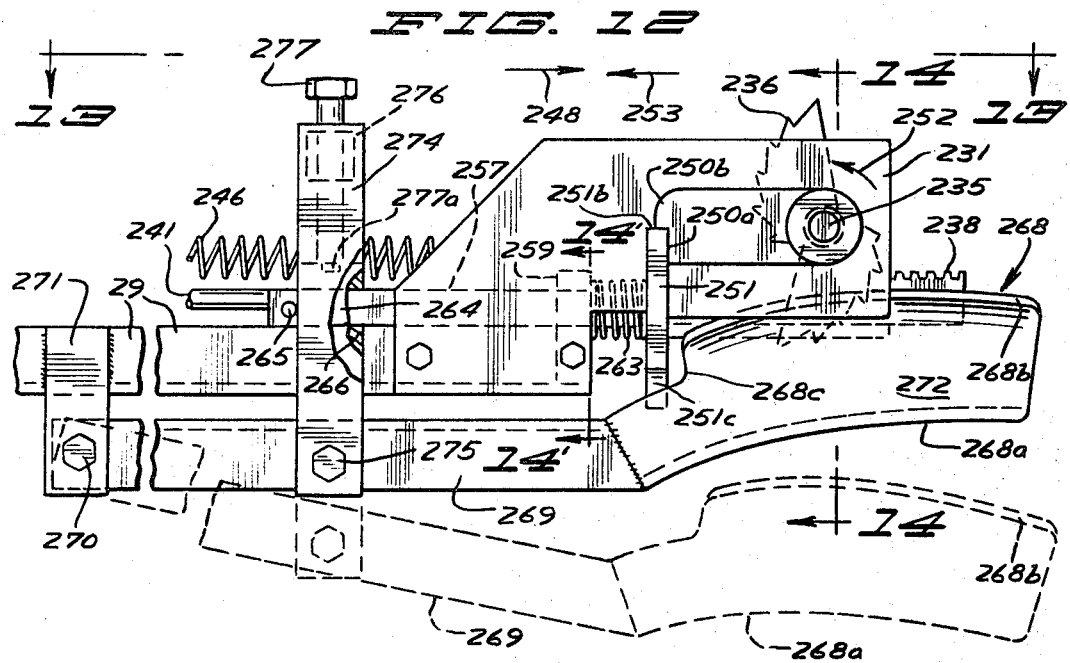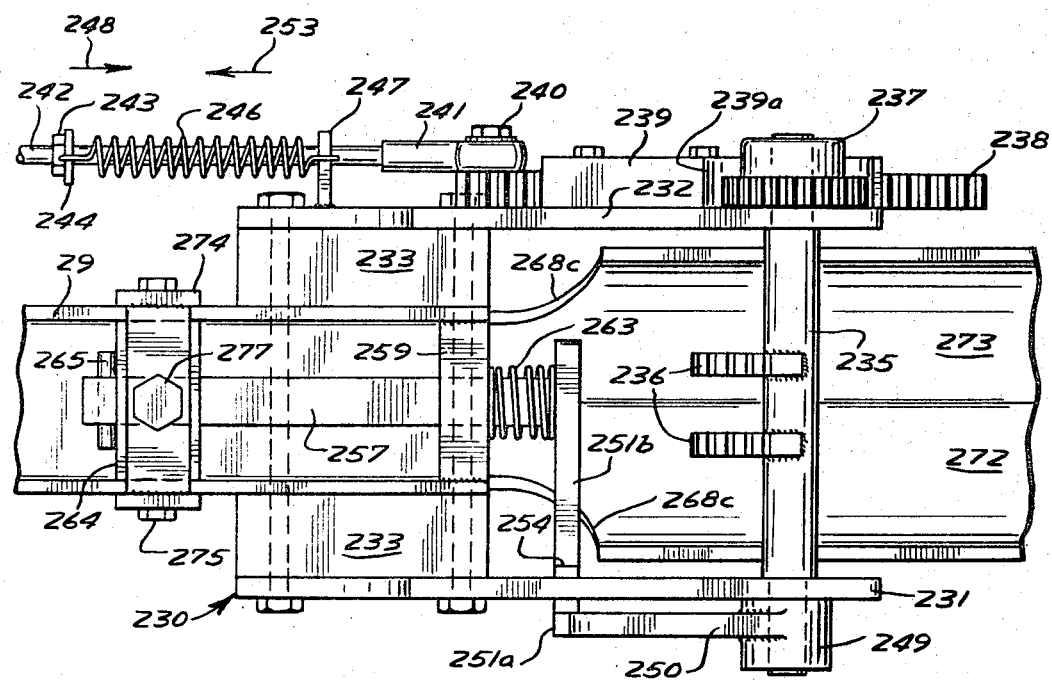

INVENTORS
OTTO WOSERAU
HAROLD N. ANDERSON

United States Patent Office 3,416,434
Patented Dec. 17, 1968

3,416,434
CHRISTMAS TREE LOADER APPARATUS
Otto Woserau, Minneapolis, and Harold N. Anderson, Golden Valley, Minn., assignors to Bemis Company, Inc., Minneapolis, Minn., a corporation of Missouri
Filed May 8, 1967, Ser. No. 636,894
31 Claims. (Cl. 100—144)

ABSTRACT OF THE DISCLOSURE

Trailer mounted apparatus for loading a Christmas tree into plastic netting including gripper mechanism for pulling the tree through a funnel to radially compress the branches of the tree, said gripper mechanism being mounted on a carriage for longitudinal movement. The gripper mechanism is automatically operated to grip the tree trunk at one position and release the tree trunk at a second position. Automatically operated clutch mechanism is provided to stop the drive to the carriage adjacent longitudinally spaced position.

BACKROUND OF THE INVENTION

The invention is directed to apparatus for radially compressing the branches of a Christmas tree and packaging the tree in plastic netting or similar material to retain the tree in a compressed condition. Prior art Christmas tree loading apparatus includes a funnel through which a Christmas tree is drawn by a cable mounted on a reel remote from the funnel. However, each time, prior to pulling another tree through the funnel, the operator has to pull the cable to the funnel which slows down the operation and involves hard manual labor. The prior art also includes mounting a number of endless conveyors to provide a somewhat closed type of housing with the inner runs of the conveyors converging to radially compress the tree branches as it is moved therethrough. At least some prior art Christmas tree loaders have been provided with mechanism to wind twine in a helical manner about the tree as the tree is moved forward to retain the tree in a branch compressed condition. However, this requires tying the twine to each end of the tree; and after the twine is tied, it can slip whereby it is no longer tightly around the tree. To provide a relatively simple, high speed Christmas tree loader that overcomes problems of the aforementioned nature, as well as others, this invention has been made.

SUMMARY OF THE INVENTION

Apparatus for loading a Christmas tree that includes gripping mechanism that is drivenly translated between a position adjacent a funnel and a remote position, said gripping mechanism being automatically pulled to a cocked condition as the carriage on which the gripping mechanism is mounted moves to a datum condition. Automatically operated clutch mechanism terminates the drive to the carriage adjacent the datum position and adjacent the funnel.

One of the objects of the invention is to provide a carriage having tree trunk gripper mechanism that is drivenly reciprocated between two longitudinally spaced positions for drawing a tree through a funnel. In furtherance of the above object, it is another objective of this invention to provide automatically operated clutch mechanism for terminating the drive thereto adjacent each of said two positions. A still further object of this invention is to provide new and novel tree trunk gripping mechanism on a Christmas tree loader that is pulled to a cocked position and releasably retained in a cocked position.

BRIEF DESCRIPTION OF THE DRAWINGS

FIGURE 1 is a side elevation of the apparatus of this invention showing the carriage in solid lines adjacent the front end of the machine and in dotted lines in its rearwardmost position;

FIGURE 2 is a fragmentary plan view of the funnel end portion of the apparatus of this invention, said view being generally taken along the line and in the direction of arrows 2—2 of FIGURE 1;

FIGURE 3 is an enlarged transverse sectional view generally taken along the line and in the direction of the arrows 3—3 of FIGURES 4 and 9 to illustrate the carriage drive and the mounting of the carriage;

FIGURE 4 is a fragmentary side view of the front end portion of the apparatus of FIGURE 1, said view being generally taken along the line and in the direction of arrows 4—4 of FIGURE 3, and showing the gripper mechanism operating crank in a cocked position in solid lines and in gripping position in dotted lines;

FIGURE 5 is a fragmentary plan view of the first embodiment of gripper jaw operating mechanism and gripper jaws, said view being generally taken along the line and in the direction of arrows 5—5 of FIGURE 1 to show the jaws in a cocked position in solid lines and one of the jaws in a tree trunk gripping position in dotted lines;

FIGURE 6 is an enlarged cross sectional view of the structure of FIGURE 5, said view being generally taken along the line and in the direction of arrows 6—6 of FIGURE 5;

FIGURE 7 is a transverse sectional view looking rearwardly toward the gripper jaws, said view being generally taken along the line and in the direction of arrows 7—7 of FIGURE 6;

FIGURE 8 is a transverse cross sectional view generally taken along the line and in the direction of arrows 8—8 of FIGURE 6;

FIGURE 9 is an enlarged fragmentary plan view showing the clutch operating mechanism and mounting thereof, longitudinally intermediate portions of the machine not being illustrated and portions of overlying structure being broken away to illustrate other structure therebeneath;

FIGURE 10 is a fragmentary longitudinally cross section view of the front end portion of the structure of FIGURE 9, said view being generally taken along the line and in the direction of the arrows 10—10 of FIGURE 9;

FIGURE 11 is a fragmentary cross sectional view generally taken along the line and in the direction of the arrows 11—11 of FIGURES 1 and 9 with the carriage in the dotted line position of FIGURE 1 to show portions of the clutch operating mechanism;

FIGURE 12 is a fragmentary side elevational view of the second embodiment of the gripper jaws and gripper jaw operating mechanism showing a datum position of the upper gripper jaws in part in solid lines and a tree gripping position in dotted lines, said view being generally taken along the line and in the direction of arrows 12—12 of FIGURE 14 other than the lower jaw is shown in a second position in dotted lines;

FIGURE 13 is a plan view of the structure of FIGURE 12; and

Figure 14:
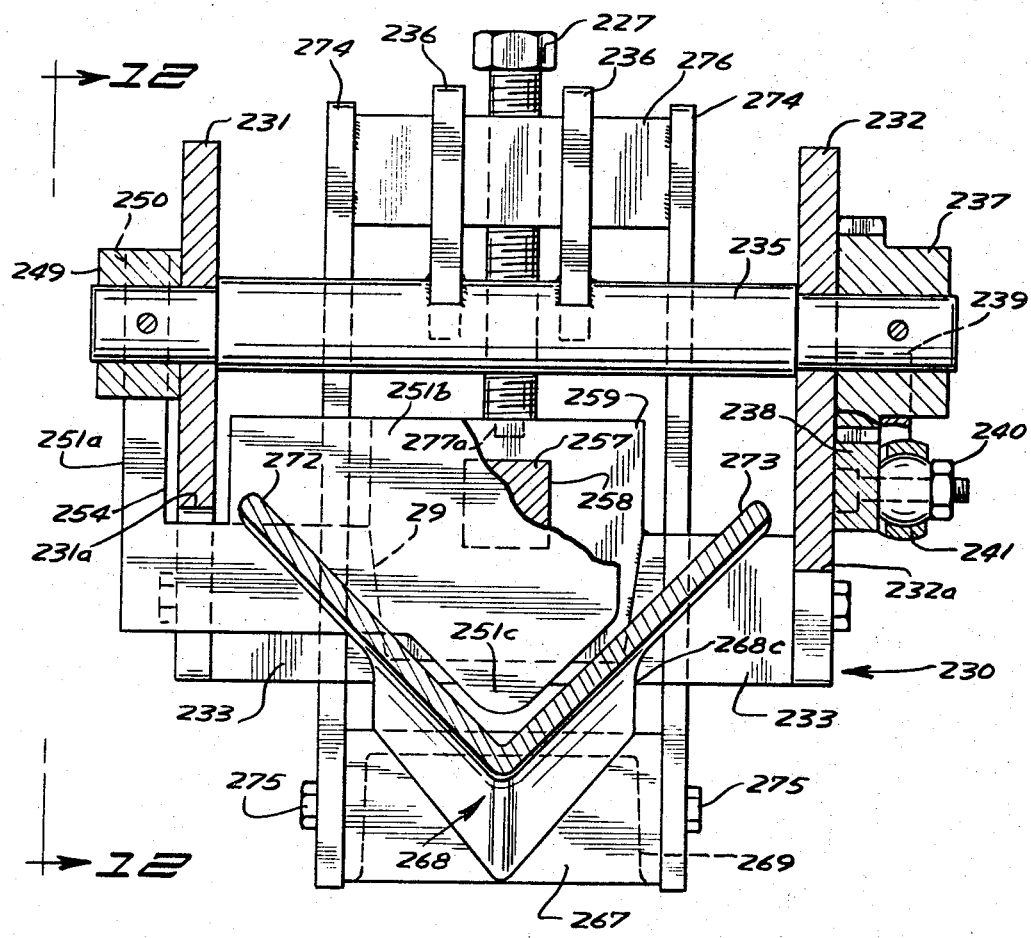
FIGURE 14 is a transverse cross sectional view of FIGURE 12 with portions broken away, said view for the most part being taken along the line and in the direction of the arrows 14—14 of FIGURE 12, and in part along the line and in the direction of the arrows 14'—14' of FIGURE 12.

Referring now in particular to FIGURES 1–3, the Christmas tree loading machine of this invention, generally designated 10, includes a frame having a pair of transversely spaced, longitudinally elongated bottom channels 11, a pair of transversely spaced, longitudinally elongated top frame members 12, front vertical channels 13, rear vertical channels 14, a plurality of pairs of intermediate vertical channels 15, intermediate channels 16, transverse bottom channels 19, and transverse top channels 17 that are connected together to form a generally open boxed type frame. A wheel assembly 22 is mounted by the longitudinal midportions of channels 11 while a trailer hitch assembly 28 is connected to the front end portion of the frame to permit towing. A retractable third wheel assembly 49 is mounted by the assembly 28 to hold the front end of the frame in an elevated position.

Mounted on the top transverse channel 17 to extend thereabove, and located transversely intermediate top frame members 12 are a pair of parallel support members 18 that extend the longitudinal length of the frame. On one of the support members 18 there is bolted a rail 20 while on the other support member there is bolted a rail 21, each rail having a lower horizontal leg secured to the respective support member. The rails 20 and 21 extend longitudinally and have upper horizontal legs that extend inwardly toward one another whereby the transverse spacing between the upper legs is substantially less than the transverse spacing between the lower legs.

Mounted on the rails 20, 21 for reciprocal movement therealong is a carriage having a pair of transversely spaced, L-shaped plates 23. The horizontally elongated legs 23a of plates 23 extend to both higher and lower elevations than the upper legs of the rails. At both the forward and rearward end portions of legs 23a there is provided an upper transverse roller mount 27 that extends transversely outwardly of said legs, which at each end portion rotatably mounts a roller 25 to ride on the upper leg of the respective rails 20, 21. Vertically beneath each upper roller mount there is provided a corresponding lower roller mount 27 having on each of its end portions, a lower roller 26 rotatably mounted to bear against the under surface of the upper leg of the respective rails 20, 21.

Plates 23 each include a forward, upwardly extending leg 23b, a longitudinally elongated U-shaped channel 29 having its rearward end portion extended between legs 23b and welded to the upward end portions thereof. As may be noted from FIGURE 1, channel 29 extends a substantial distance longitudinally rearwardly of plates 23 and is located at a substantially higher elevation than the legs 23a.

Referring now to FIGURES 5-8, the first embodiment of the gripper jaw and gripper jaw operating mechanism will be described. To the rearward end portion of each leg of the channel 29 there is welded longitudinally elongated, vertical plate 30 that extends above said channel. Secured to and extending between plates 30 and the rearward edges of the legs of the channel 29 is a vertical, transverse plate 31, while to the lower edge of plate 31 there is welded a horizontal, rearwardly extending plate 32. Welded to the upper edge of plate 31 to extend a substantial distance horizontally rearwardly of and parallel to plate 32 is a plate 33. A transverse plate 34 is dependingly welded to an intermediate portion of plate 33, and to the rearward edge of plate 32 to extend a substantial distance therebeneath. There is provided a reinforcing bar 37' that is secured to the lower end portion of plate 34 and to the forward end portion of a horizontal plate 36. Plate 36 is also attached to the lower edge of plate 34 to extend rearwardly of plate 34 in parallel relationship to plate 33.

Plate 33 diverges outwardly in a rearward direction and each rear corner portion has a mounting member 43 dependingly secured thereto. A boss portion 36a of a gripper control member 36 is extended through apertures provided in one corner portion of plate 33 and the adjacent mounting member 43 while a boss portion 35a of a second control member 35 is likewise extended through apertures provided in the opposite corner portion of plate 33 and the adjacent member 43. A vertical pivot member 37 is mounted by and extended through vertical apertures provided in control member 35, a first corner portion of plate 36 and the mounting member 39 which is secured to said corner portion. Likewise a vertical pivot member 38 is extended through control member 36, a second corner portion of plate 36 and mounting member 39. On pivot member 37 there is provided a spacer 40 in abutting relationship with member 39, and a gripper jaw 41 keyed thereto intermediate and in abutting relationship with spacer 40 and boss 35a. Likewise on pivot member 38 there is keyed a jaw 42 intermediate boss 36a and a spacer 40 that abuts against mounting member 39. Jaw members 41, 42 are of the same construction other than one is a left hand jaw and the other is a right hand jaw. Further, as may be noted from FIGURE 5 for jaw 41, the jaw has a plurality of angularly spaced teeth that in a clockwise direction as viewed in FIGURE 5 progressively extend a greater distance radially outwardly from the pivot axis of pivot member 37, i.e. teeth 41a, 41b, 41c, 41d, 41e.

Each control member has a generally radially extending arm 35b, 36b respectively, the adjacent corner portions of the radial arms remote from the respective pivots 37, 38 having a pivot pin 44 extended therethrough. A control link 45 has one end portion pivotally connected to pivot member 44 of arm 36b, and an opposite end portion extended between a pair of plates 46 and pivotally connected thereto by a pivot member 47. A second control link 48 has one end portion pivotally connected at 44 to arm portion 35b and an opposite end portion extended between plates 46 and pivotally connected thereto by a pivot member 47 that is transversely spaced from the first mentioned pivot member 47.

Plates 46 are fixedly attached to the rear end portion of a longitudinally elongated operating rod 51, rod 51 being slidably extended through a mounting block 52, which is secured to the front portion of plate 33 to extend thereabove. On the operating rod at a position forwardly of the mounting block 52 there is attached an annular cam member 53 to move therewith, the cam member having an annular beveled surface 53a that converges inwardly toward the rod in a forward direction. The rearward end of a longitudinally elongated eye bolt 54 is secured in the forward end of the operating rod, a nut 55 being threaded on the operating rod to retain a mounting bracket 56 in abutting relationship with the operating rod. The eye bolt is extended through bracket 56. One end of a coil spring 58 is attached to bracket 56 while an opposite end is attached to a bracket 59 which is mounted on block 52 for constantly resiliently urging bolt 54 and rod 51 in a rearward direction (direction of arrow 203). As will become more apparent hereinafter, spring 58 through the previously described structure resiliently urges the jaws to pivot in opposite directions to positions of minimum spacing between corresponding teeth 41e, 42e of said jaws. Cam 53 in abutting against block 52 limits the maximum pivotal movement of the jaws in said opposite directions.

The forward end of the eye bolt is pivotally mounted on a pivot member 62, said pivot member being mounted on the outer end of one radial arm of a crank member 63 (see FIGURES 3 and 4). Mounted on the outer end of the second radial arm of the crank member is a roller 65. The central boss portion of the crank member is pivotally mounted from one end portion of a transverse pivot bolt 66, said bolt being extended through legs 23b at a slightly lower elevation than channel 29. A spacer 67 is provided on bolt 66 intermediate legs 23.

A longitudinally elongated vertical plate 69 is mounted on the lower leg of rail 21 to extend thereabove at a location a short distance rearwardly of the front end of the frame. Plate 69 has a rearward inclined edge 69a that is inclined in an upwardly and forwardly direction in a position to have roller 65 abut thereagainst; and a top horizontal edge 69b in a position to have the roller 65 roll there across.

Attached to the rear uprights 14 to extend rearwardly thereof are a pair of transverse plates 73, the frusto conical portion 74a of the funnel 74 being mounted on plates 73 (see FIGURES 1 and 2). The funnel also has a reduced diameter portion 74b that is secured to the minor base end of portion 74a to extend forwardly thereof at a higher elevation than the rails 20, 21. Portion 74b is retained at a sufficiently high elevation that the legs 23a of the carriage may move to the forward end portion thereof; and the central axis of the funnel is located at an elevation that is transversely between jaws 41, 42 vertically at about the elevation of the midportion of said jaws; and transversely centered relative plates 23 and rails 20, 21. A platform 75 is pivotally connected at 79 to plates 73 to be moved between a horizontal condition extending rearwardly of the funnel and a folded up position abutting against the major base end of funnel portion 74a.

In order to move the carriage between a position at least partially beneath funnel 74 and a position at the front portion of the machine, there is provided a rear idler shaft 76 that is rotatably mounted by bearing members 77, members 77 in turn being dependently secured to the top frame members. A chain sprocket 78 is mounted on shaft 76.

A carriage drive sprocket 80 is keyed to front shaft 81, shaft 81 in turn being rotatably mounted by bearing members 84 that are dependingly secured to the top frame members 12 a short distance rearwardly of the front uprights. A chain 82 is extended around sprockets 78, 80 and has one end of its upper run pivotally connected to a mounting member 83 and at opposite ends connected to the other end of said mounting member. Mounting member 83 in turn extends between, is secured to legs 23a of the carriage longitudinally intermediate the front and rear carriage rollers and aids to retain said legs in transverse spaced relationship. In order to prevent the carriage rolling off the forward ends of rails 20, 21 a transverse top bracket 86 is bolted to rails 20, 21 while the rearward movement of said carriage is limited by a stop bracket 85 mounted on said frame members in a position to prevent the legs 23b of the carriage striking the funnel. Upper and lower chain guides 103, 104 are mounted on the frame longitudinally intermediate shafts 76, 81.

In order to drive shaft 81 in one angular direction, a sprocket 88 is rotatably mounted on shaft 81 intermediate sprocket 80 and one frame member 12; while in order to drive the shaft in the opposite angular direction, a sprocket 87 is rotatably mounted on shaft 81 transversely between the opposite frame member 12 and the sprocket 80. A clutch member 89 is mounted on shaft 81 intermediate sprockets 80, 88 to rotate with said shaft but not relative thereto; clutch member 89 being axially movable on said shaft to have the teeth thereof for drivingly engaging mating teeth of sprocket member 88. Likewise clutch member 90 is mounted on shaft 81 intermediate sprockets 80, 87 to be transversely moved between a position drivingly engaging sprocket 87 and a position out of driving engagement therewith.

In order to drive the sprockets 87, 88 motor 92 is mounted on a plate 93, plate 93 in turn being mounted by bottom channels 11 (see FIGURE 4). Motor 92 is drivenly connected by a chain 94 to the drive sprocket 95 of the reversing gear box generally designated 96. Box 96 is mounted on plate 91 which in turn is mounted on channels 11. Sprocket 95 is rotatably mounted on transversely elongated shaft 97, shaft 97 having one end portion mounted within the reversing gear box housing 98 and an opposite end portion rotatably mounted by a bearing mount and bearing mount bracket 99 that is mounted on plate 91. A small diameter sprocket 100 is keyed to shaft 97 transversely between sprocket 95 and member 99. A chain 101 drivingly connects sprocket 100 to sprocket 88.

The housing 98 has a second driven sprocket 105 extending outwardly therefrom in a direction opposite shaft 97, a small diameter sprocket 106 being keyed to shaft 105 to through chain 107 drive sprocket 87. Shafts 97, 105 are constantly driven in opposite directions by gears (not shown) in housing 98, said gears in turn being driven by an annular member 108 that surrounds shaft 97 and is drivenly connected to the sprocket 95. The structure of the reversing gear box will not be further described since it is a conventional stock item sold under the name "Speed Changer" Model 22, and manufactured by Hub City Iron Company, Aberdeen, S. Dak.

In order to retain the jaws 41, 42 and jaw operating mechanism in a cocked, tree trunk receiving position, a lock link 120 has one end portion pivotally mounted on a fixedly positioned transverse pivot member 121, pivot member 121 being mounted by plates 30 at a slightly lower elevation than rod 51 and forwardly of plate 31. A forward end portion of link 120 has a transverse stud 123 that is extendable into the notches 124 of the rearward end portion of the generally right angular operating links 125. The central portions of links 125 are pivotally mounted on a fixedly positioned transverse pivot member 126 which in turn has its opposite ends mounted in plates 30 at about the same elevation as pivot member 121 but a substantial distance longitudinally forwardly of stud 123 and pivot 121. The outer end of the depending arms of links 125 have downwardly opening notches 126 in which the stud 127 extends. Stud 127 is mounted on the forward end portion of the longitudinally extending pusher rod 128, rod 128 extending between links 125. An intermediate portion of rod 128 is slidably extended through appropriate apertures provided in plate 31 while a rear end portion on said rod is slidably extended through appropriate apertures provided in plate 34. A collar 131 is keyed to rod 128 longitudinally intermediate plates 31, 34; one end of a coil spring 132 bearing against collar 131 and the opposite end bearing against plate 31 to resiliently urge rod 128 to move in a rearward direction (direction of arrow 203). Accordingly, spring 132 urges rod 128 to move in the direction to, through stud 127, pivot links 125 in the direction of arrow 133 at about pivot 126; links 125 in being urged to pivot in the direction of arrow 133 urge stud 123 and control link 120 to tend to pivot about pivot member 121 in a direction of arrow 134. However, the maximum pivotal movement of link 120 in the direction of arrow 134 is limited by the offset 120a of link 120 abutting against the surface of rod 51, said offset having a forward vertical edge abuttable against the vertical rear surface of cam member 53 to prevent said cam member moving in the direction of arrow 203 until link 120 has been pivoted in the direction opposite arrow 134 to an elevation beneath said cam member. However, when the cam member is located longitudinally between offset 120a and plate 31 with the offset abutting against rod 51, due to the upwardly and forwardly inclined surface 136 of the offset, as rod 51 and cam member 53 are moved in the direction of arrow 202, link 120 is cammed downwardly in the direction opposite arrow 134 until the cam member 53 has moved thereover, and thereafter through the action of spring 132 and the structure previously described, locking lever 120 is again moved relative rod 51 to the position illustrated in FIGURE 6.

The rear end portion of pusher rod 128 mounts a pusher plate 138 longitudinally intermediate plate 34 and jaws 41, 42; the central axis of rod 128 and plate 138 being longitudinally aligned with the central axis of the funnel.

In order to operate the clutch members 89, 90 between a neutral position, a position clutch 89 drives shaft 81, and a position clutch 90 drives shaft 81, there is provided the clutch operating mechanism generally designated 145 (see FIGURES 3 and 9–11). Mechanism 145 includes a pair of lugs 146 that are extended into the annular groove of clutch member 89 and mounted diametrically opposite one another by the one end portions of vertically spaced links 147. The opposite ends of links 147 extend along opposite edges of the boss portion of the bracket 148 and are pivotally connected thereto by a vertical pivot member 149. A bracket 148 is dependingly secured to a plate 150 and blocks 151 which in turn are bolted to the rails and rail supports, this bracket being located vertically beneath rail 21.

A second set of diametrically spaced lugs 146 are pivotally connected to the one end portions of a pair of links 153 to extend into the annular groove of clutch member 90. The opposite ends of links 153 are pivotally connected by a vertical pivot member 149 to the boss portion of a second bracket 148. The second bracket 148 is dependingly secured to plate 150 and block 151 at a location vertically beneath the rail 20. As may be noted from FIGURE 9, links 147 are located transversely opposite sprocket 80 from links 153. A yoke 154 has one end portion pivotally mounted on a pivot member 155 which in turn is mounted by the forward end portions of links 147. The opposite end of the yoke is pivotally mounted on a pivot member 156 which in turn is mounted by the forward end portions of links 153. A portion of pivot member 156, which extends beneath the lower link 153, extends into the rear notch portion of a radial arm 158 of a crank member, the opposite end of arm 158 being connected to an annular member 159 that is mounted on a pivot member 160. The upper end portion of member 160 is dependingly secure to the front transverse frame member 17.

The last mentioned crank member includes a second radial arm 162 that extends at generally right angles to arm 158 and has one end connected to annular member 159. The opposite end of arm 162 has one longitudinally extending end of a generally longitudinally extending rod 163 pivotally connected thereto by a pivot member 164. The opposite end of rod 163 is pivotally connected at 171 to one end portion of a generally transversely extending arm 166. The intermediate portion of rod 163 is curved to extend transversely toward frame member 12 whereby the opposite ends thereof are located on transverse sides of a vertical plane containing the pivot axes of pivots 160 and pivot 149 of link 153. The opposite end portion of arm 166 is pivotally connected by a pivot member 167 to a plate 168. Plate 168 is attached to a longitudinally central portion of the lower chain guide 104.

Vertical pivot member 171 also mounts the forward end of link rod 172 and the rearward end of link rod 173, rod 163 being located between rods 172, 173. Link rods 172, 173 extend longitudinally in generally the same vertical plane.

The front end of link rod 173 is connected by a pivot member 174 to the outer end of radial arm 175. The opposite end of arm 175 is clamped to the lower end of a vertical pivot shaft 176 which in turn pivotally extends through annular member 177. Annular member 177 extends through and is mounted by a transversely extending plate 178, plate 178 being bolted to frame member 12 and rail 20.

The upper end of shaft 176 has one end of an operating arm 181 clamped thereto, the opposite end of the operating arm having a roller 182 rotatable mounted thereon by a member 183. A second operating arm 186, which is located adjacent the funnel 74, at one end through a member 188 mounts a roller 187 to rotate about a vertical axis. The opposite end of arm 186 is clamped to an intermediate portion of a vertical pivot shaft 189, the upper end of shaft 189 having a hand operated lever 190 connected thereto. Locking mechanism 165 is mounted on lever 190 to cooperate with a plate 185 secured to frame member 12 to releasably lock the lever in only the neutral position.

The portion of shaft 189 below arm 186 pivotally extentds through an annular mount 191, an intermediate portion of mount 191 extending through and being welded to a transverse bar 192. One end portion of bar 192 is secured to frame member 12 and the opposite end portion to a support 18 and rail 20. The lower end of shaft 189 has one end of a radial arm 193 clamped thereto, the opposite end of said arm having the rearward end of link rod 172 pivotally connected thereto by a pivot member 194.

Rollers 182, 187 are mounted and connected together by members previously described to be simultaneously pivoted in either a clockwise direction or a counterclockwise direction the same angular amount about the pivots 176, 189 respectively. The neutral position of roller 187 is shown in solid lines in FIGURE 9, roller 187 being movable in a clockwise direction to the right-hand dotted line position of FIGURE 9 at which ttime drive is furnished to the carriage to move the carriage forwardly, and in a counterclockwise direction to the left-hand dotted line position of FIGURE 9 wherein the drive is furnished to the carriage to move the carriage towards the funnel. The neutral position of roller 182 is in part indicated by the position of arm 181 in FIGURE 9. In order to automatically operate the rollers 182, 187 between their three positions as set forth hereinafter, an angle iron 197 is welded to one plate 23 to have its horizontal leg extend outwardly at the same elevation as rollers 182, 187.

Referring now to FIGURES 12–14, the second embodiment of the gripper jaw and gripper jaw operating mechanism, generally designated 230, will now be described. The mechanism 230 includes a pair of longitudinally extending, vertical plates 231, 232 that are mounted in transverse spaced relationship outwardly of the respective vertical leg of the rearward end portion of channel 29 to extend rearwardly thereof. A block 233 is provided transversely intermediate the channel and each vertical plate and is secured to said channel and the respective plate. Each plate has a downwardly and rearwardly opening notch 231a, 232a, respectively, that extends from adjacent the rearward end of the channel. The vertical plates rotatably mount a transverse shaft 235 at a substantially higher elevation than channel 29 and at a location substantially horizontally rearwardly of said channel. Mounted on the intermediate portion of channel 235 in transverse spaced relationship is a pair of toothed gripping jaws 236 that in side elevation have the same shape as the gripping jaws 41 in the plan view. The jaws are transversely spaced equal distances from the horizontal axis line of the funnel and on either side thereof.

On the end portion of shaft 235 that extends transversely outwardly of plate 232 there is keyed a gear 237 that has teeth to form a mating fit with the teeth provided on the upper edge portion of a longitudinally elongated rack 238. The rack 238 is mounted for longitudinal reciprocal movement by a guide bracket 239, said bracket having a notch portion 239a whereby the gear teeth extend into abutting engagement with the rack teeth. Bracket 239 is mounted on plate 232. The front end portion of rack 238 mounts a pivot member 240 that extends transversely outwardly thereof, the rear end portion of a longitudinally elongated operating rod 241 being pivotally mounted on pivot member 240. The rearward end of a longitudinally elongated eye bolt 242 is secured to the forward end of the operating rod, a nut 243 being threaded on the operating rod to retain a mounting bracket 244 in abutting relationship with the operating rod. The forward end of the operating rod is pivotally connected to a bell crank similar to bell crank 63 in FIGURE 3 other than it is located on the transverse opposite side of the crank from that illustrated in FIGURE 3, the angular extension on the crank arms relative the central portion thereof is varied to function as will be set forth hereinafter and the pivot 66 for the crank is located at a lower elevation than that illustrated in FIGURE 3.

One end of a coil spring 246 is connected to bracket 244 and the opposite end is connected to a bracket 247. Bracket 247 is mounted on plate 232 to extend transversely outwardly thereof at a higher elevation than rod 241. Spring 246 constantly resiliently urges rod 241 and thereby rack 238 to move rearwardly toward the funnel (direction of arrow 248).

In order to releasably retain the jaws 236 in their cocked, datum position; on the end portion of shaft 235 outwardly of plate 231 there is keyed a boss 249 having an elongated control arm 250 extending radially outwardly thereof. The outer end portion of arm 250 is provided with a forwardly and downwardly opening notch 250a into which the pressure or trigger plate 251 extends to prevent the arm pivoting about shaft 235 in direction of arrow 252; while said outer end portion of the arm is also provided with an arcuately curved edge portion 250b for camming plate 251 in the direction of arrow 253 when shaft 235 is rotated in a direction opposite the arrow 252. When arm 250 extends horizontally forwardly of shaft 235, notch 250a underlays the forward portion of surface 250b. The aforementioned camming of plate 251 in the direction of arrow 253 permits arm 250 and pressure plate 251 moving relative to one another to positions that the pressure plate can move in the opposite direction to extend into notch 250a.

As may be noted from FIGURE 14, the pressure plate has an elongated upwardly extending projection 251a transversely outwardly of plates 231, 232, the projection 251a being separated from the main body 251b of the pressure plate by an upwardly opening notch 254 through which plate 231 extends.

In order to mount the pressure plate in a vertical, transversely extending condition, the rearward end portion of a longitudinally extending rectangular bar 257 is welded thereto. Bar 257 has a lower edge approximately the same height as the upper edges of channel 29 and is transversely centrally located relative the length of the channel, the intermediate portion of bar 257 being slidably extended through an aperture 258 of the bracket 259 that is attached to channel 29 adjacent the rear edge thereof. A coil spring 263 has one end bearing against bracket 259 and an opposite end bearing against the pressure plate to constantly resiliently urge the pressure plate to move in the rearward direction (arrow 248). The forward end portion of rod 257 is slidably extended through an aperture provided by the transversely extending generally U-shaped bracket 264 being bolted to bracket 266. Transverse bracket 266 is secured to and abuts against the legs of channel 29. The rearward movement of rod 257 is limited by a transverse pin 265 extended through said bar in a position to abut against front surface bracket 264.

In order to mount the lower jaw, generally designated 268, vertically beneath jaws 236 and permit limited adjustment thereof, there is provided a channel 269 that in transverse cross section is the same as channel 268 except that it is oppositely faced. The forward end portion of channel 269 is pivotally mounted between a pair of bars 271 by a pivot member 270, the upper end of said bars being attached to legs of channel 29 at a location a substantial distance forwardly of bracket 266. A pair of vertically elongated bars 274 extend along side of the legs of channels 29, 269 and have their lower end portions connected to channel 269 by pivot member 275. At an elevation vertically above channel 29, the bars 274 are connected together and retained in spaced relationship by a transversely extending bar 276. A bolt 277 is threadably extended through the central portion of bar 276 and has reduced diameter, non-threaded lower end portion 277a extended into an aperture in the upper portion of bracket 264 to permit some play between said reduced diameter end portion and the walls defining said aperture. By threading bolt 277 in bar 276 in the appropriate direction, the chamber 269 may be pivoted about pivot 270 between, for example, the two positions illustrated in FIGURE 12, to move the lower jaw between the two positions illustrated in said figure.

Referring to FIGURE 14, jaw 268 in transverse cross section is V-shaped, the line of the apex 268a of the jaw and the central axis of the funnel lying in a common plane. As may be noted from FIGURE 12, the upper longitudinal edges 268b of the lower jaw as well as the lower edge 268a are arcuately curved about a point at a substantially lower elevation than said jaw. Additionally, the upper front portions of the walls 272, 273 defining said jaw are provided with upwardly opening cutouts 268c, while the front edges of said walls are welded to a transverse plate 267 which in turn is welded to channel 269. As a result of providing cutouts 268c, which extend to a position longitudinally rearwardly of the pressure plate 251, the lower jaw may be moved to a position that the upper edges 268b extend to a higher elevation than the elevation of the upper edges of channel 29. Further due to the arcuate curving of the jaws as viewed in side elevation, the forward edges of the jaw are at a lower elevation than the corresponding longitudinally central portions of said jaw. As a result, as the lower jaw is moved into the funnel, a tree trunk that extends to a relatively lower elevation will still be received between the walls 272, 273 of said lower jaw. Further the pressure plate has a rounded, somewhat V-shaped depending portion 251c transversely centered relative the jaw longitudinally adjacent cutouts 268c that extend to a lower elevation than the longitudinally extending upper edges of walls 272, 273 that in part define said cutouts when the jaw is in a raised position.

The structure of the apparatus of this invention having been described, the operation thereof will now be set forth. In using the apparatus of this invention, a supply of plastic, tubular open mesh netting 199, for example "Vexar," appropriatery name of E. I. du Pont de Nemours and Co., is placed on the reduced diameter portion of the funnel. Such a supply of netting may be continuous length sufficient for, for example, 60 trees. The trunk end of the tree 200 is inserted into the frusto conical portion 74a and moved toward the reduced diameter portion. Then the hand crank 190 is pivoted in the direction of arrow 201 sufficiently that roller 187 is moved to the counterclockwise dotted line position of FIGURE 9 (assuming the carriage is forwardly of the dotted line position of FIGURE 1). This pivotal movement of the crank 190 results in link rods 172, 173 being moved generally longitudinally forwardly in the direction of arrow 202 whereby, through pivot 171, control link 163 is swung and moved generally longitudinally forwardly in the same direction. This movement of rod 163 causes arms 158, 162 to pivot in the direction of arrow 204 about pivot member 160 whereby links 147, 153 are moved in the direction opposite of arrows 205 about their respective pivots 149. The aforementioned movement of links 147, 153 through lugs 146 shifts clutch members 89, 90 in the direction opposite arrow 215 whereby clutch member 89 is brought into driven engagement with sprocket 88. As a result shaft 81 is driven in the direction opposite arrow 207 whereby chain 82 moves the carriage and the mechanism thereon in the direction of arrow 203 toward the funnel. It is to be noted that at this time the gripper mechanism is in a cocked position illustrated in FIGURES 5 and 6 since roller 65 is bearing against edge 69b.

As the carriage approaches the funnel, the gripper mechanism is moved into the reduced diameter portion of the funnel toward the tree trunk. At about the time the carriage is moved to its dotted line position of FIGURE 1, the angle bracket 197 abuts against roller 187 whereby said roller is cammed from the counterclockwise dotted line position of FIGURE 9 to the solid line position of said figure. This movement of the roller results in link rods 172, 173 being moved generally in the direction of arrow 203; and through link rod 163 being moved in the same direction, arm 158 is pivoted in the direction opposite arrow 204. Accordingly the lugs 146 move the clutch members in the direction of arrow 215 to the neutral position illustrated in FIGURE 3. This results in the drive connection between sprocket 88 and clutch member 89 being broken and the carriage coming to a stop.

Now, if necessary, the tree is moved slightly further into the funnel until the tree trunk 200 abuts against plate 138 to move rod 128 relative channel 29 in the direction of arrow 202. This movement of rod 128 moves crank arm 125 to move link 120 opposite the direction of arrow 134 and thereby offset 120a out of engagement with cam member 53. At this time spring 58 causes rod 51 to move relative the channel 29 in the direction of arrow 203 which through links 45, 48 and control members 36 and 35 moves jaws 41, 42 to pivot in the direction of arrows 209, 210 respectively about their pivot member. This pivotal movement of the jaws brings the teeth into abutting engagement wtih diametric opposite sides of the tree trunk.

To be noted, at the time rod 51 is moved in the direction of arrow 203, the crank arm 63 is pivoted relative plates 23 in the direction of arrow 211 from the solid line position of FIGURE 4 to a dotted line position of said figure.

After the tree trunk has been grippingly engaged by the gripper mechanism, the operator pulls the terminal end of the netting 199 in the direction of arrow 202 to extend beyond the funnel and moves the hand lever 190 in the direction opposite arrow 201 such that roller 187 is moved from the solid line position of FIGURE 9 to the clockwise dotted line position of said figure. The last mentioned pivotal movement of the hand lever through the connector links 172, 163 causes arms 158, 162 to be pivoted in the direction opposite arrow 204 whereby the lugs 146 are moved in the direction of arrow 215 from the solid line positioned illustrated in FIGURE 3 and roller 182 to be moved to a position to be engaged by member 197 when the carriage is adjacent the forward end of the frame. This results in the clutch members 89, 90 being moved in the direction of arrow 215 whereby clutch member 90 is moved into driven engagement with sprocket 87. As a result shaft 81 is driven in the direction of arrow 207 whereby the carriage is moved toward the front end of the frame.

Due to the cut of the teeth of the jaws, as the carriage is moved toward the front end of the frame, the teeth tend to bite deeper into the trunk to more firmly grip the trunk of the tree. Thus the forward movement of the carriage pulls the tree through the frusto conical portion 74b to compress the tree branches. As the branches are initially pulled through the forward end of funnel portions 74b, the operator having the forward terminal edge of the netting 199 grips a forward branch of the tree and thus as the tree is moved forwardly pulls the netting over the tree. As a result, netting surrounds the branches of the tree as the branches are moved forwardly of the funnel and prevents the branches from spreading out to their normal position.

After the top of the tree has been pulled through the reduced diameter portion of the funnel, the hand lever is again pivoted to move roller 187 to its neutral position whereby the drive of the carriage is terminated. Thereafter, the netting is clipped at the top of the tree. Now the hand lever is moved whereby the clutch member 90 is again brought into driven engagement with sprocket 87 to move the carriage forwardly. As the carriage is moved to the forward end portion of the frame, roller 65 rides up on inclined edge 69a to cause crank arm 63 to pivot relative plate 23 in the direction opposite arrow 211 whereby rods 54, 51 are pivotally swung to generally move in the direction of arrow 202 against the action of spring 58. This movement of rod 51 brings the frusto conical portion of cam member 53 into engagement with the inclined edge 136 of the offset to force link 120 to pivot in the direction opposite arrow 134 about pivot member 121 whereby the cam member rides over the top horizontal edge of said offset. The last mentioned pivotal movement of link 120 forces crank arm 125 to be pivoted in the direction opposite arrow 133 to cause rod 128 to move in the direction of arrow 202 against the resilient action of spring 132. However, when the cam 53 has been moved forwardly such that the rearward edge is in front of offset 120a, said offset is moved into abutting engagement with rod 51 through the resilient action of spring 132. At about the same time, roller 65 is on the horizontal edge 69b of the cam plate.

The aforementioned movement of rod 51 in the direction of arrow 202 through the linkage connections pivoted jaws 41, 42 in the direction opposite arrows 209, 210 respectively whereby the tree trunk is released.

After roller 65 is moved up onto the horizontal edge 69b of the cam plate, angle bracket 197 engages roller 182 to move it and its radial arm 181 to the neutral position illustrated for said arm in FIGURE 9. Arm 181 in being moved to its neutral position results in the lugs 146 moving the clutch members 89, 90 in the direction opposite arrow 215 to the neutral position of FIGURE 3. Accordingly the drive to the carriage is stopped. The stop bracket 86 is provided at the front end of the machine to prevent any substantial forward movement of the carriage resulting from inertia.

After the gripping mechanism has released the tree, the tree is removed from the loader, and the machine is ready to have the carriage moved to its rearward position to grip the tree. In order to efficiently utilize the apparatus of this invention, advantageously one party loads Christmas trees onto the platform 75 and pushes the trunk end into the funnel, a second party operates the hand operated lever and pulls the netting to and around the tree branches as the tree is moved out of the funnel, and the third party removes the tree from the forward end of the machine.

Using the gripper jaw operating mechanism of the second embodiment, the vertical spacing of the lower jaw relative to shaft 235 is adjusted for the general range of diameter of the trees to be packaged by threading bolt 277 in the appropriate direction to either raise or lower such jaw. Thus if relatively large trees are to be packaged which have relatively large diameter trunks, the jaw will be adjusted to the dotted line position of FIGURE 12; whereas, if relatively small trees having small diameter trunks are to be packaged, the jaw will be adjusted to the solid line position of the figure. Obviously the vertical elevation of the jaw may be adjusted between the two mentioned positions; however, due to the construction of the upper jaws 236 that cooperate with the lower jaw, the spacing of the lower jaw relative the shaft 235 is not critical for a limited range of tree trunk diameters.

After the carriage has been moved in the manner previously described with reference to the first embodiment to position the mechanism 230 within the reduced diameter portion of the funnel, the lower jaw moves rearwardly into underlying relationship with the tree trunk to a position that the pressure plate 251 abuts against and is retained in a given position, while the remainder of the mechanism 230 moves rearwardly. The relative movement of the pressure plate 251 moves the projection 251a from beneath the notch portion of arm 250. Thereupon, due to the resilient action of a spring 246, the operating rod 241 and rack 238 is moved in the direction of arrow 248 relative channel 29 to impart pivotal movement to gear 237 to turn shaft 235 in the direction of arrow 252. This pivots jaws 236 in the same direction to position teeth thereof to bear against the upper portion of the tree trunk and push the lower portion of the trunk into more firm abutting engagement with the lower jaw. Thereafter the drive to the carriage is applied to move the carriage in forward direction. The initial movement of the carriage in the forward direction exerting a pulling force against the tree results in the teeth of jaws 236 more firmly grippingly engaging the tree trunk (rotate shaft 235 a slight amount in direction of arrow 252) and thereafter pull the tree trunk through the funnel.

When the carriage has been moved forwardly to a position that the lower of the crank arm on plates 23 abuts against the cam plate, the eye bolt 242 and operating rod 241 are pulled generally in direction of arrow 253 whereupon the rack 238 is moved longitudinally forwardly relative plates 231, 232 to rotate shaft 235 in direction opposite arrow 252. This results in the jaws 236 being moved out of gripping engagement with the tree. Thereupon the tree may be removed from the gripping jaw mechanism. Further the aforementioned rotation of shaft 235 in the direction opposite arrow 252 results in the arcuately curved surface 250b of arm 250 being brought into abutting engagement with the pressure plate 251 whereupon the pressure plate is moved forwardly relative the channel against the resilient urging of the spring 263. After surface 250b has been moved out of engagement with the pressure plate, the pressure plate is moved rearwardly by spring 263 to snap into the notched portion 250a to prevent arm 250 and shaft 235 being rotated in the direction of arrow 252 until a force has been exerted against the pressure plate 251 to move it forwardly relative channel 29 as previously described.

Most Christmas trees have trunks of diameters in the range of about 1½ to 5 inches. With the first embodiment of the invention, in order for the gripping jaw mechanism to handle tree trunks within the above range of diameters, two sets of gripping jaws would be used, one set for the larger diameter trunks and a second for the smaller diameter trunks. Of course, either set can be used for trunks of diameters coming within the intermediate portion of this range. Normally most trees cut in a given area would be of diameters that could be satisfactorily gripped with one set or the other.

Advantages of the second embodiment of gripper mechanism over the first embodiment are that it is less expensive to make and has a more positive gripping action. Additionally with the second embodiment it is not necessary to change jaws to handle trunks of diameters coming within the above mentioned range. Rather the elevation of the lower jaw may be varied by turning bolt 277 which does not require near as much time as would be required to change the jaws of the first embodiment.

The embodiments of the invention in which an exclusive property or privilege is claimed are defined as follows:

1. Apparatus for radially compressing the branches of a tree for a packaging operation comprising a longitudinally elongated frame having a front end portion and a rear end portion, a funnel mounted on the rear end portion of the frame to extend thereabove for having a tree passed therethrough, said funnel having a reduced diameter portion extending longitudinally toward said front end portion, elongated guide rails mounted on the frame to extend from adjacent said front end portion to adjacent said reduced diameter portion, a carriage mounted on said rails for reciprocal movement between a first position adjacent said front end portion, and a second position adjacent said reduced diameter portion, means mounted on said carriage to extend rearwardly thereof for pulling a tree through said funnel as the carriage is moved from adjacent said reduced diameter portion toward said front end portion, and power means on said frame for moving said carriage between its positions.

2. The apparatus of claim 1 further characterized in that said power means includes a power source on said frame, driven means on the frame for moving said carriage between its positions, first means on the frame operable between a first condition for drivingly connecting said power source to the driven means to move the carriage toward said funnel, a second condition for drivingly connecting said power source to the driven means to move said carriage in a direction away from said funnel and a third neutral condition that no drive is furnished from the power source to said driven means, an operating member mounted on the carriage for movement therewith, and operated second means mounted on the frame and operated by said operating member for operating said first means from its first condition to its third condition as the carriage is moved adjacent to its second position and from its second condition to its third condition as the carriage is moved adjacent to its first position.

3. The apparatus of claim 2 further characterized in that said driven means includes an idler shaft, a sprocket mounted on one end portion of the frame, a driven shaft rotatably mounted on the other end portion of the frame, a sprocket keyed to the last mentioned shaft, and a chain extended around the above mentioned sprockets and connected to the carriage to longitudinally move said carriage.

4. The apparatus of claim 3 further characterized in that said first means includes a reversing gear box on the frame drivenly connected to said power source and having a first output shaft driven in one angular direction and a second output shaft driven in a second angular direction, a first and a second clutch sprocket mounted on said driven shaft for rotation relative thereto, means for drivingly connecting the first output shaft to the first clutch sprocket, means for drivingly connecting the second output shaft to the second clutch sprocket, and clutch third means mounted on the driven shaft for movement between three positions to in a first position engage said first clutch sprocket to drive said driven shaft in one angular direction, a second position to engage said second clutch sprocket to drive said driven shaft in an opposite angular direction and a third position out of driven engagement with both of said clutch sprockets.

5. The apparatus of claim 4 further characterized in that said second means includes operable fourth means for selectively moving said clutch means between its three positions, fifth means connected to the fourth means for being operated by the operable member to move the clutch means from its first position to its third position when the carriage moves adjacent to the funnel, sixth means connected to the fourth means for being operated by the operable member to move the clutch means from its second position to its third position when the carriage moves adjacent its first position.

6. The apparatus of claim 5 further characterized in that the tree trunk pulling means comprises a longitudinally elongated subframe mounted on the carriage to extend rearwardly thereof at an elevation to be extended into the funnel reduced diameter portion, first and second gripping jaw means relatively movable between a first position to grippingly engage a tree trunk and a second spread apart position to release a tree trunk, operable seventh means for mounting said jaw means and relatively moving them between their positions, control means on the carriage and connected to the seventh means for operating the seventh means to move the jaw means from their first position to their second position, and means connected to the frame adjacent its front end portion for operating the control means to operate said seventh means to move the jaw moving means and jaw means to the jaw means second position when the carriage is moving toward and is adjacent its forward position and means connected to the control means for resiliently urging the control means to operate the seventh means to move the jaw means to their relative first position.

7. The apparatus of claim 6 further characterized in that said seventh means comprises a transverse shaft, means for rotatably mounting said shaft on the subframe, said first gripping jaw means being keyed to said transverse shaft, a toothed gear keyed to said transverse shaft and rack means longitudinally movable relative the subframe from a first position to a second position to rotate said gear and thereby the shaft to move the first gripping jaw means from its first position to its second position, said control means being connected to said rack means to move it between its positions.

8. The apparatus of claim 6 further characterized in that said tree trunk pulling means includes eighth means on the subframe for cooperating with the control means to releasably retain the control means in a condition that the seventh means is maintained in a gripping jaw means second position until after a tree trunk has been extended between said gripping jaw means and thereafter permitting the control means to operate seventh means to operate the gripping jaw means to their relative second position, said eighth means including pressure plate mechanism movably mounted on the subframe in a first position to abut against a tree trunk when the carriage is moved to its rear position and thereafter movable relative the subframe to a second position, and trigger mechanism on the subframe that is moved by the pressure plate mechanism for moving from its first position to its second position to release said control means.

9. The apparatus of claim 8 further characterized in that said control means includes a longitudinally movable rod, and that said trigger mechanism includes a stop attached to the rod to move therewith and means mounted on the subframe for abutting against said stop to retain it and thereby the rod in a forward position until said plate mechanism has been moved from its first position toward its second position, said resilient means being connected to said rod to urge it to move rearwardly.

10. Apparatus for radially compressing the branches of a tree comprising a longitudinally elongated frame having a front end portion and a rear end portion, a carriage, means mounted on the frame for mounting the carriage for reciprocal movement between said end portions, a funnel mounted on the rear portion of the frame to have a tree passed therethrough, said funnel having a reduced diameter portion extending longitudinally toward the front end portion, first means mounted on the carriage to extend rearwardly thereof for grippingly engaging a tree trunk in said funnel when the carriage is adjacent said funnel, said first means including a longitudinally elongated subframe mounted on said carriage to extend rearwardly thereof, jaw means for grippingly engaging a tree trunk of a tree extending in said funnel, operable second means pullable from a second condition to a first condition for mounting said gripping jaw means, moving said jaw means to a first non gripping position as the second means is operated to its first condition and moving said jaw means to a second position grippingly engaging a tree trunk as the second means is operated to its second condition, said second means being mounted on said subframe, means connected to the second means for resiliently urging the second means to its second condition, third means mounted on the subframe for releasably retaining the second means in its first condition and upon abutting against a tree trunk releasing the second means to permit it moving to its second condition, operable fourth means connected to the second means for pulling the second means from its second condition to its first condition, means on the frame for operating the fourth means to operate the second means to its first condition as the carriage moves toward the front end portion, and means on the frame for moving the carriage between its positions.

11. The apparatus of claim 10 further characterized in that said second means includes a pair of spaced, parallel jaw mounting shafts and that said jaw means includes a gripping jaw keyed to each shaft, each jaw having a plurality of teeth that progressively extend further outward from the respective shaft.

12. The apparatus of claim 11 further characterized in that said fourth means includes a longitudinally elongated control rod having a front end portion, a bell crank having a central portion pivotally connected to the carriage, a first radial arm pivotally connected to the control rod front end portion and a second radial arm operated by the means for operating the fourth means.

13. The apparatus of claim 10 further characterized in that fourth means includes a longitudinally elongated, control member mounted for longitudinal movement relative the subframe, said control member having a rear end portion connected to the second means for operating the second means to the second means first condition as the control member is moved forwardly relative the subframe, said second means being movable to its second condition as the control member moves rearwardly relative the subframe from a forward position, and that the third means includes a stop mounted on the control member to move therewith, a pressure operated member mounted on the subframe for movement therewith and limited movement relative thereto from a first position to a second position as it is moved in abutting engagement with a tree trunk, fifth means on the subframe for movement between a position abutting against said stop member to releasably hold it against rearward movement and a release position, and means on the subframe operated by the movement of said pressure operated member to its second position for moving said fifth means to its release position.

14. The apparatus of claim 13 further characterized in that said stop member and fifth means have cooperating surface portions.

15. The apparatus of claim 10 further characterized in that said jaw means includes a longitudinally elongated lower jaw, and an upper gripping jaw, and that said second means includes means mounted on the subframe for mounting the lower jaw to extend forwardly of said subframe, and means mounting said upper jaw above the lower jaw and moving the upper jaw relative the lower jaw between a tree trunk gripping position and a tree trunk release position.

16. The apparatus of claim 15 further characterized in that said lower jaw means comprises an upwardly opening trough that is generally V-shaped in transverse cross section.

17. The apparatus of claim 15 further characterized in that the lower jaw mounting means comprises a longitudinally elongated frame member having a rear end portion connected to the lower jaw and means mounted on the subframe for mounting said frame member and selectively moving said frame member to adjust the elevation of said lower jaw.

18. The apparatus of claim 15 further characterized in that said means for moving the carriage includes a power source, drivable means mounted on the frame and connected to the carriage for moving it between its two positions, and operable means for selectively connecting the power source to the drivable means to drive the drivable means to move the carriage toward the funnel, connecting the power source to the drivable means to drive the drivable means to move the carriage away from the funnel, and terminating the drive from the power source to the drivable means.

19. The apparatus of claim 18 further characterized in that there is provided means on the frame that is operated by the carriage moving toward and adjacent the frame front end portion to operate the last mentioned operable means to terminate the drive to the drivable means, and by the carriage moving toward and adjacent the frame rear end portion to terminate the drive to the drivable means.

20. The apparatus of claim 15 further characterized in that said upper jaw mounting and moving means comprises a transversely extending shaft, said upper jaw being mounted on said shaft to rotate therewith, means mounted on the subframe to extend forwardly thereof for rotatably mounting said shaft forwardly of said subframe, and means operated by the fourth means to rotatably move said shaft.

21. The apparatus of claim 20 further characterized in that the third means comprises a vertical, transversely extending pressure plate, means mounted on the subframe for mounting said pressure plate in axial alignment with the funnel for limited reciprocal movement between a longitudinally forward position and a longitudinally rearward position and resiliently urging said plate to its rearward position, and means keyed to said shaft for abutting against said pressure plate to releasably retain the shaft in an upper jaw release condition when the plate is in its rearward position and cam the plate forwardly when the shaft is rotated to move the upper jaw from its tree trunk gripping condition to its release position.

22. The apparatus of claim 21 further characterized in that the means for moving the shaft comprises a toothed gear mounted on said shaft, a longitudinally elongated rack mounted for longitudinal movement relative the subframe and having teeth forming a matching fit with the gear teeth and means attached to the shaft mounting means for mounting the rack for longitudinal movement.

23. In apparatus for releasably grippingly engaging a tree trunk to pull it in a longitudinally forward direction, a carriage longitudinally reciprocal between a forward position and a rearward position, a longitudinally elongated subframe mounted on the carriage to extend rearwardly thereof, first and second gripping jaw means relatively movable between a first position to grippingly engage a tree trunk and a second spread apart position to release a tree trunk, third means for mounting said gripping jaw means on the subframe in a position to have a tree trunk received therebetween and relatively moving said gripping jaw means between their positions, fourth means connected to the third means for resiliently urging the third means to relatively move the gripping jaw means to their relative first position, fifth means for releasably retaining the third means in a condition to hold said gripping means in their relative first position until a tree trunk is between said first and second gripping means in a position to be gripped thereby and then permitting the third means moving the gripping means to their relative first position, said third means including a shaft, said first gripping means being mounted on said shaft to move therewith, sixth means for rotatably connecting the shaft to the subframe, seventh means for mountingly retaining the second gripping means in a given spaced relationship to shaft, and eighth means for rotating the shaft to move said first gripper means between a first position relative said second gripping means to grippingly engage a tree trunk and a second position more remote from said second gripping means to release a gripped tree trunk.

24. The apparatus of claim 23 further characterized in that said eighth means includes a toothed gear keyed to said shaft, said shaft being mounted by the sixth means to extend transversely, and a longitudinally movable rack slidably mounted on said sixth means, said rack having a toothed portion for rotating said gear as the rack is longitudinally moved.

25. The apparatus of claim 23 further characterized in that said second gripping means includes a longitudinally elongated trough opening toward said first gripping means.

26. The apparatus of claim 25 further characterized in that said trough is generally V-shaped in transverse cross section and has upper and lower edge portions that are arcuately curved to rearwardly in the general direction of elongation of the trough to first progressively extend more closely adjacent to a plane of the shaft axis that is parallel to the general direction of elongation of the trough and then progressively away from said plane.

27. The apparatus of claim 26 further characterized in that the seventh means comprises a longitudinally elongated member having a rear end portion joined to the front end portion of said trough to mount said trough to extend beneath said first gripping means and a front end portion, means for pivotally connecting said front end portion to the subframe to permit pivoting said member to move the trough more closely adjacent said shaft and alternately away from said shaft and means mounted on the subframe and connected to said member for selectively adjusting the direction that said member extends angularly away from said pivot means to selectively move said trough to a given position relative said shaft, and that said fifth means includes a pressure plate forwardly of said shaft, and means mounting said pressure plate for limited movement relative the subframe in a position above said trough to be engaged by a tree trunk extending between said trough and first gripper means, said pressure plate having a somewhat V-shaped portion extending toward said trough and said trough having cutout portions longitudinally adjacent said plate portion to permit at least the part of the trough rearwardly of said pressure plate extending to a higher elevation than said plate portion.

28. The apparatus of claim 23 further characterized in that said fifth means includes a pressure plate, means mounting said pressure plate on the subframe for limited longitudinal movement relative the subframe between a rearward position to be engaged by a tree trunk extended between said first and second gripper jaw means and a forward position, and ninth means keyed to the shaft to abut against the pressure plate in its rearward position to hold the shaft against rotation in a direction to move the first gripping means to a tree trunk gripping position, and when the pressure plate is in its forward position and the first gripping means is in a tree trunk gripping position move the pressure plate rearwardly as the shaft is rotated to return the first gripping means to its tree trunk release position.

29. The apparatus of claim 28 further characterized in that said fifth means includes means for resiliently urging said pressure plate to its rearward position, and that the ninth means comprises an elongated arm having an outer end portion, said arm outer end portion having a notch into which the pressure plate extends when the pressure plate is in its forward position and the first gripping means is in its release position and a camming surface adjacent said notch to abut against said pressure plate to move the pressure plate rearwardly as the shaft is rotated to move the first gripping means from its tree trunk gripping position to its release position.

30. In apparatus for releasably grippingly engaging a tree trunk to pull it in a longitudinally forward direction, a carriage longitudinally reciprocal between a forward position and a rearward position, a longitudinally elongated subframe mounted on the carriage to extend rearwardly thereof, first and second gripping jaw means relatively movable between a first position to grippingly engage a tree trunk and a second spread apart position to release a tree trunk, third means for mounting said gripping jaw means on the subframe and relatively moving them between two positions, fourth means connected to the subframe for resiliently urging said third means to move said gripping means to their relative first position, said third means including a longitudinal elongated rod mounted for movement between a rearward position and a forward position, and means for connecting said rod to the jaw means to relatively move said jaw means to their first position when the rod moves rearwardly and to their second position when the jaws move forwardly, a pressure plate, fifth means mounted on the subframe for movement between a first position mounting the pressure plate generally forwardly of the jaw means in their first position and a second position retaining the pressure plate rearwardly of its first position, cooperating means attached to said rod and operatively connected to the fifth means to releasably retain the said rod in its forward position when the fifth means is in its first position, and permit said rod moving to its rearward position when a force is exerted on the pressure plate to move the fifth means to its second position.

31. The apparatus of claim 30 further characterized in that said cooperating means comprises a stop member fixedly attached to said rod, a locking lever having one end portion pivotally mounted on the frame and a second end portion for movement between a first position abuttable against the stop member to hold such stop member against rearward movement, and a second position more remote from said rod and stop member, and means mounted on said subframe and operatively connected to said fifth means and the locking lever to pivot the locking lever away from the stop member to its second position when the pressure plate is moved to its first position to permit the rod moving rearwardly, and to pivot the locking lever to its first position after the rod has moved forwardly, said stop member and locking lever having cooperating surfaces for moving the locking lever away from its first position as the rod is moved forwardly to its first position.

References Cited

UNITED STATES PATENTS

| | | | |
|---|---|---|---|
| 2,720,055 | 10/1955 | Morris | 53—124 XR |
| 2,792,775 | 5/1957 | Beyette | 100—13 |
| 2,847,805 | 8/1958 | Robbins | 53—24 |
| 2,974,457 | 3/1961 | Saxton | 53—124 XR |
| 3,135,191 | 6/1964 | Skinner | 53—124 XR |
| 3,358,418 | 12/1967 | Manetta | 53—124 |

BILLY J. WILHITE, *Primary Examiner.*

U.S. Cl. X.R.

53—124; 100—100, 295